United States Patent
Noll et al.

(10) Patent No.: US 11,100,025 B2
(45) Date of Patent: Aug. 24, 2021

(54) SELECTABLE SYSTEM CONTROLLER FOR MULTI-PROCESSOR COMPUTING SYSTEMS

(71) Applicant: Hamilton Sundstrand Corporation, Charlotte, NC (US)

(72) Inventors: Christopher Brian Noll, Glastonbury, CT (US); Steven A. Avritch, Bristol, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 103 days.

(21) Appl. No.: 16/112,244

(22) Filed: Aug. 24, 2018

(65) Prior Publication Data
US 2020/0065284 A1 Feb. 27, 2020

(51) Int. Cl.
G06F 13/40 (2006.01)
B64C 13/50 (2006.01)
B64C 19/00 (2006.01)

(52) U.S. Cl.
CPC ........ *G06F 13/4027* (2013.01); *B64C 13/505* (2018.01); *B64C 19/00* (2013.01)

(58) Field of Classification Search
None
See application file for complete search history.

(56) References Cited

U.S. PATENT DOCUMENTS

| | | | | |
|---|---|---|---|---|
| 4,622,667 A | * | 11/1986 | Yount | G05B 9/03 700/79 |
| 5,995,376 A | | 11/1999 | Schultz et al. | |
| 6,564,059 B1 | * | 5/2003 | Cyr | H04W 8/26 455/403 |
| 6,584,560 B1 | | 6/2003 | Kroun et al. | |
| 6,640,273 B1 | | 10/2003 | Spisak et al. | |
| 7,398,437 B2 | | 7/2008 | Mastro et al. | |
| 10,095,594 B2 | * | 10/2018 | Vanderah | G06F 13/4068 |
| 2002/0133693 A1 | | 9/2002 | Morrison et al. | |
| 2006/0200278 A1 | | 9/2006 | Feintuch | |
| 2007/0101242 A1 | * | 5/2007 | Yancey | G06F 13/4256 714/776 |
| 2014/0195712 A1 | * | 7/2014 | Ryu | G06F 13/4022 710/313 |
| 2015/0286599 A1 | | 10/2015 | Hershberger et al. | |
| 2019/0016443 A1 | * | 1/2019 | Alfred | G05D 1/101 |

OTHER PUBLICATIONS

Extended European Search Report for EP Application No. 19191249.2, dated Feb. 11, 2020, pp. 8.

* cited by examiner

*Primary Examiner* — Farley Abad
*Assistant Examiner* — Dayton Lewis-Taylor
(74) *Attorney, Agent, or Firm* — Kinney & Lange, P. A.

(57) ABSTRACT

A system includes a computing system and a cable connector. The computing system includes a plurality of processors and an interconnect circuit configured to connect the plurality of processors to each other. The cable connector is configured to connect to the interconnect circuit and provide a channel identifier to the computing system, and the interconnect circuit is configured to set one of the plurality of processors as a system controller based on the channel identifier.

11 Claims, 5 Drawing Sheets

SELECTABLE SYSTEM CONTROLLER FOR MULTI-PROCESSOR COMPUTING SYSTEMS

BACKGROUND

The present invention relates generally to computing systems, and in particular to a system and method for selecting a system controller for multi-processor redundant computing systems.

In aircraft computing, especially in flight critical systems, redundancy is implemented to allow the system to continue to function in the event of a failure in one or more of the redundant systems. While providing redundant computing systems, it is also desirable to provide redundancy within the individual computing systems. For example, a system may include several redundant central processing units (CPUs), each having a unique CPU architecture. Some systems, such as those that include VME, PCI, PCIe, and others, require the designation of one of the CPUs as a system controller in order to handle, for example, initialization procedures. In prior art systems, the CPU inserted into the first CPU slot was hard configured to be the system controller. In this case, if it is desirable to have a different CPU as the system controller in each of the redundant computing systems, which may be the case if the CPUs have unique architectures, the desired CPU for each system must be physically inserted into the first slot, resulting in differing hardware configurations between computing systems. It is desirable to allow differing architectures to be system controllers between redundant computing systems, while allowing the redundant computing systems to have identical hardware configurations.

SUMMARY

In an example embodiment, a system includes a computing system and a cable connector. The computing system includes a plurality of processors and an interconnect circuit configured to connect the plurality of processors to each other. The cable connector, which is external to the computing system, is configured to connect to the interconnect circuit and provide a channel identifier to the computing system, and the interconnect circuit is configured to set one of the plurality of processors as a system controller based on the channel identifier.

In another example embodiment, A redundant computing system includes a plurality of parallel processors, and an interconnect circuit configured to connect the redundant computing system to an external cable connection. The interconnect circuit receives a channel identifier from the external cable connection, and is configured to set one of the plurality of processors as a system controller based on the channel identifier.

In another example embodiment, a method includes connecting a redundant computing system to a cable connector; reading, by the redundant computing system, a channel identifier from the cable connector; and setting, by an interconnect circuit of the redundant computing system, one of a plurality of processors of the redundant computing system as a system controller.

DETAILED DESCRIPTION

A redundant computing system is disclosed herein that allows selection of a system controller between parallel central processing units (CPU). The computing system may include three hardware slots for three parallel CPUs, for example, and an aircraft system may include three redundant computing systems. The three parallel CPUs may each have a different CPU architecture. The redundant computing systems may be plugged into external cable connections, such as wire harnesses. Each wire harness may provide a redundant computing system with a channel identifier (ID) upon attachment to the redundant computing system to indicate the channel of the connected redundant computing system. The interconnect circuit of the redundant computing system selects a CPU slot as the system controller based on the channel ID. This way, the hardware configuration of each redundant computing system can be identical, while having differing CPU architectures selected as system controllers between the redundant computing systems.

Figure 1:
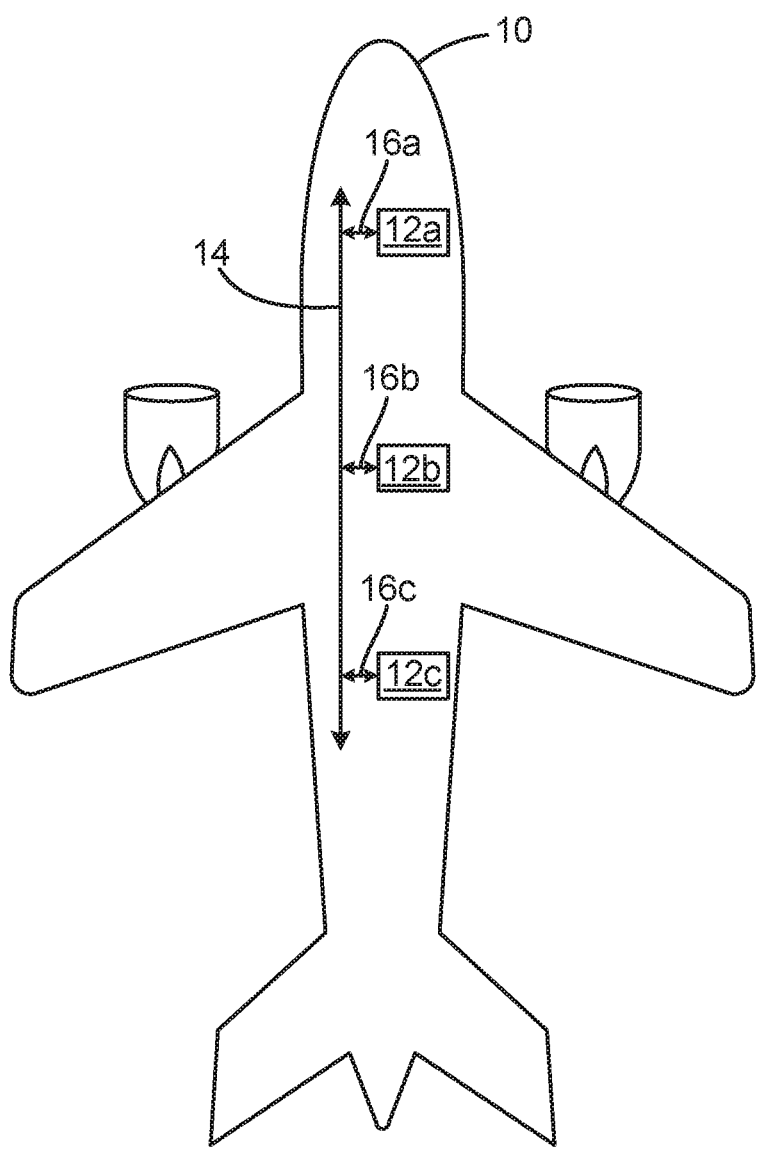
FIG. 1 is a diagram illustrating an aircraft that includes redundant computing systems.

FIG. 1 illustrates an aircraft 10 that includes redundant computing systems 12a. 12b, and 12c. It is desirable for aircraft systems, especially flight critical systems, to have redundancy in order to handle failures within the system. This redundancy can be both in the number of computing systems, as well as the components of each of the redundant computing systems. In the embodiment illustrated in FIG. 1, computing systems 12a. 12b, and 12c are connected to data bus 14 via cable connections 16a. 16b, and 16c. In other embodiments, computing system 12a, 12b, and 12c may be connected via cable connections 16a, 16b, and 16c directly to other computers or other hardware.

In some example embodiments, computing systems 12a, 12b, and 12c are VPX computing systems configured to perform flight control functions such as control of flight surface actuators, or reading pilot input. Each channel (i.e., computing system) may be configured to process the same flight control data. The data from each channel can then be compared to verify that no errors have occurred.

Data bus 14 may be any aircraft data bus configured to communicate data according to one or more communication protocols, such as the Aeronautical Radio, Incorporated (ARINC) 429 communication protocol, controller area network (CAN) bus communication protocol, military standard 1553 (MIL-STD-1553) communication protocol, Ethernet, or other analog or digital communication protocols. Cable connections 16a-16c may be wiring harnesses or other cable connections configured to plug in and connect redundant computing systems 12a-12c to data bus 14 or other electronics.

Figure 2A:
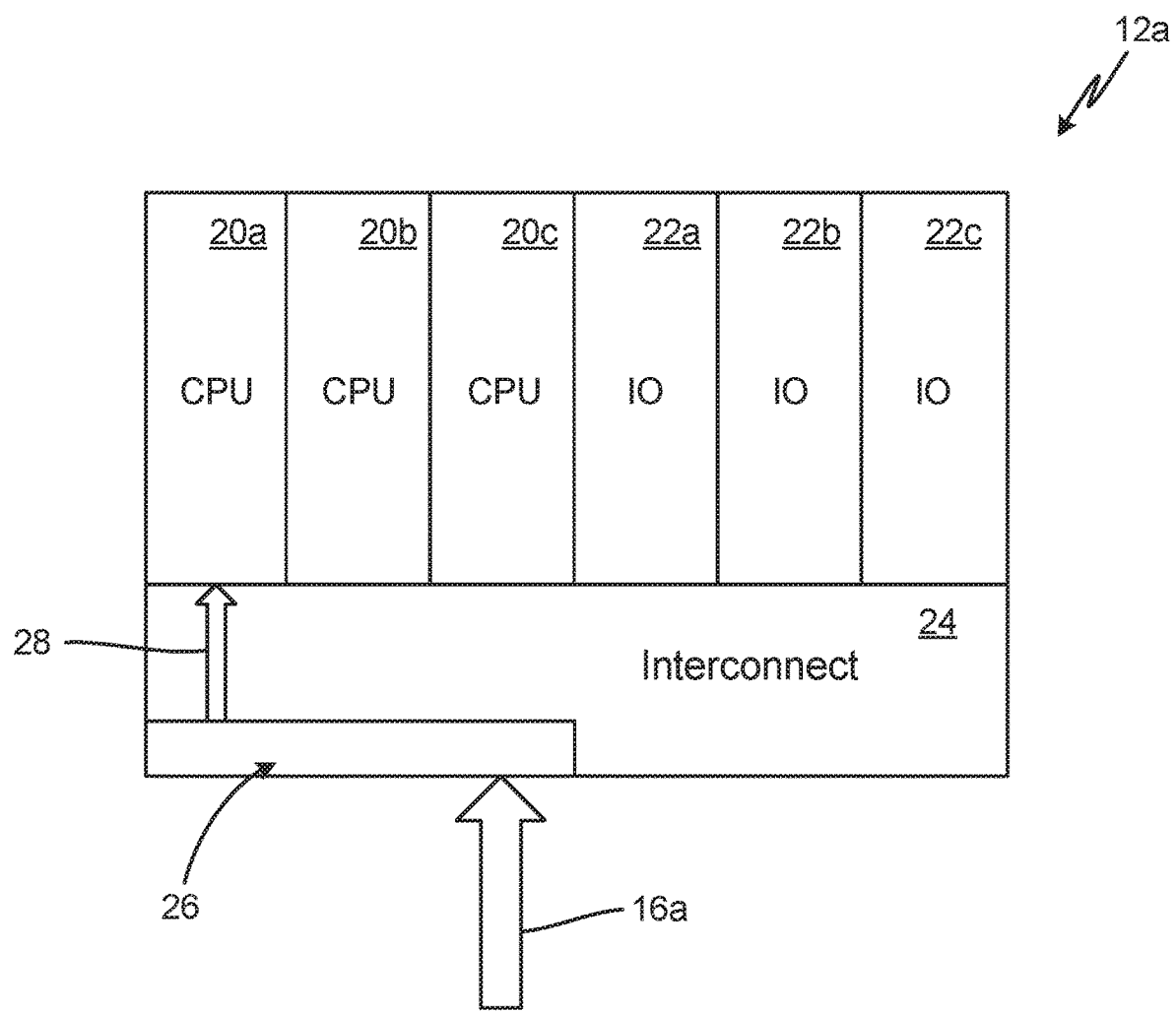
FIGS. 2A-2C are block diagrams illustrating redundant computing systems each having multiple central processing units (CPUs), each with a different CPU architecture.
Figure 2B:
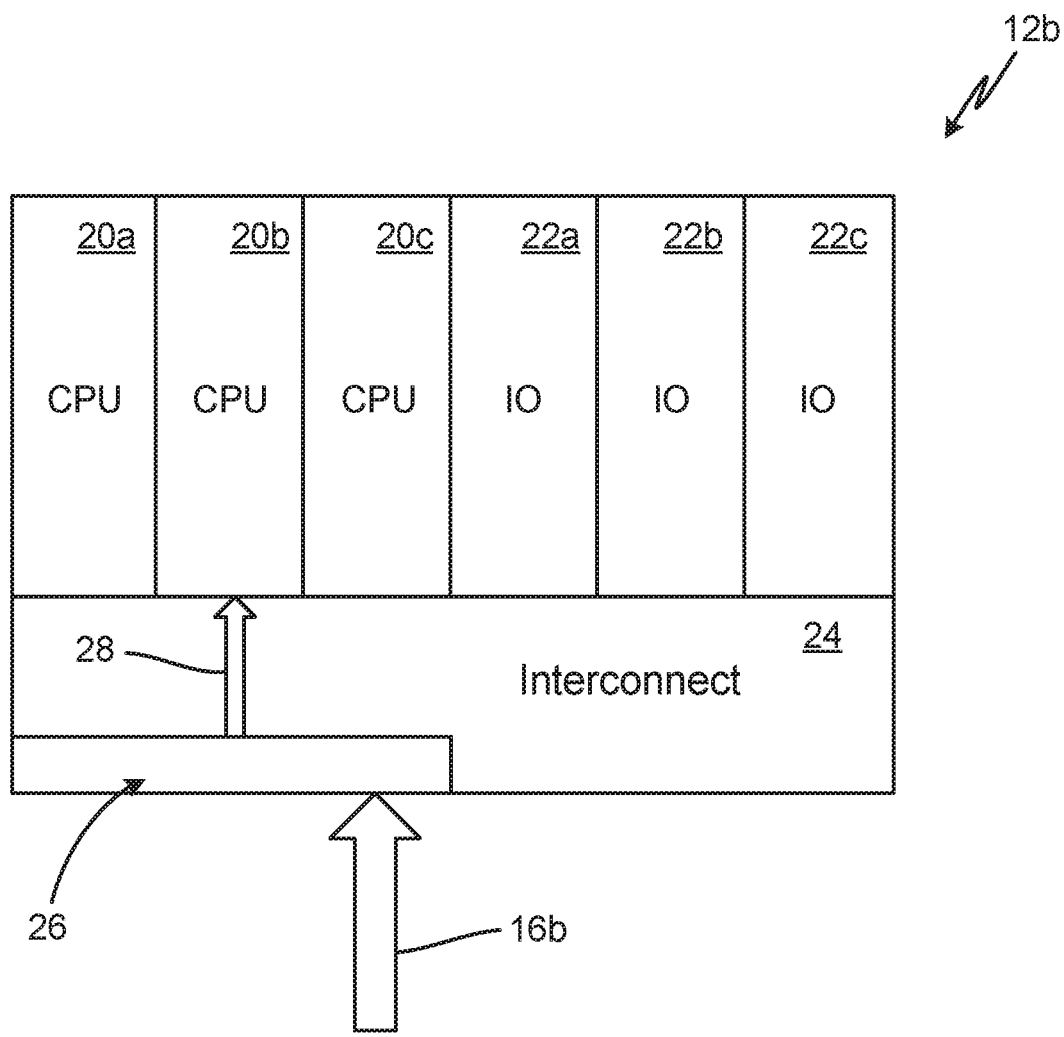
Figure 2C:
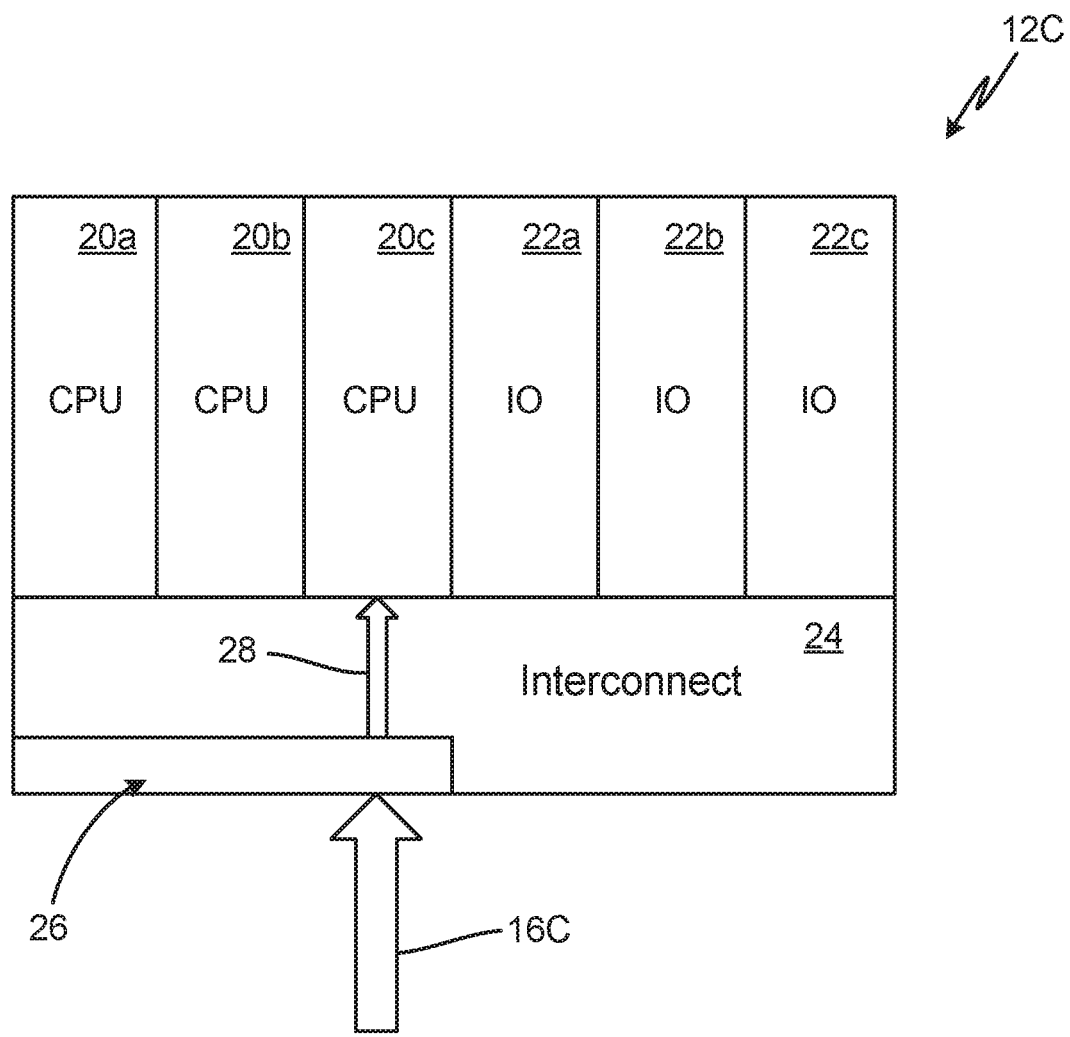

FIGS. 2A-2C are block diagrams illustrating respective redundant computing systems 12a-12c. FIGS. 2A-2C will be discussed together. Each computing system 12a-12c includes CPUs 20a-20c, IO cards 22a-22c, and interconnect circuits 24. Each interconnect circuit 24 is configured to connect to a respective cable connection 16a-16c and includes selection logic 26 to select a system controller, indicated by arrow 28. The hardware configuration of computing systems 12a-12c may be identical, which is advantageous in that a malfunctioning computing system can be replaced with another computing system without needing to alter the hardware configuration based on the installation location.

In one embodiment, computing systems 12a-12c may be VPX systems that include three parallel CPUs 20a-20c and three IO cards 22a-22c. CPUs 12a-12c may have differing architectures. In one example embodiment. CPU 12a may have an Intel architecture. CPU 12b may have an ARM architecture, and CPU 12c may have a PowerPC architecture. Having three CPUs of differing architectures allows computing systems 12a-12c to have redundancy while eliminating common mode failures. For example, if one of the CPUs has an inherent architectural error, the other redundant CPUs are not affected by that error.

Interconnect circuit 24 is a circuit configured to connect cables 16a-16c and IO cards 22a-22c to CPUs 20a-20c. Interconnect circuit 24 may be a backplane circuit or other circuit, and may implement one or more connection protocols such as, for example, VMEBus and PCI Express. IO cards 22a-22c may be configured to receive data and provide control outputs and may be, for example, analog-to-digital converters, Ethernet cards, or other IO devices. In some embodiments. IO cards 22a-22c may also be redundant cards and may include dissimilar circuitry to prevent common mode failures.

One of the parallel CPUs 20a-20c is selected as a system controller for each respective computing system 12a-12c. The system controller may be responsible for handling, among other things, initialization procedures for computing systems 12a-12c when the computing system is booted up. Computing systems 12a-12c may include a chassis that includes several hardware slots to receive each of CPUs 12a-12c. In prior VPX systems, interconnect 24 was hard coded to set the first hardware slot (for example, the slot that includes CPU 20a in FIGS. 2A-2C) as the system controller. This was often accomplished by simply connecting the system controller input to ground for the first CPU slot. However, if all computing systems 12a-12c have CPU 20a in the first CPU slot, the system controller will be of the same CPU architecture in all computing systems 12a-12c, introducing greater chance for common mode failure. In these prior systems, CPU 20b needed to be physically moved into the first slot for computing system 12b, and CPU 20c needed to be physically moved into the first slot for computing system 12c.

In the embodiment illustrated in FIGS. 2A-2C, interconnect circuit 24 is configured, using selection logic 26, to select a system controller from CPUs 20a-20c based on a channel ID received from respective cable connections 16a-16c. The channel ID may be provided as a digital signal from cable connections 16a-16c, for example, and may be indicative of the installation location of the respective computing system 12a-12c. In one embodiment, selection logic 26 may include resistors configured to pull down the respective system controller signal for CPUs 20a-20c depending on the received channel ID in order to set the respective CPU 20a-20c as the system controller. For example, and as illustrated in FIGS. 2A-2C, computing system 12a may boot, read the digital input from cable connection 16a, and know it is the first channel, setting its system controller, as illustrated by arrow 28, as CPU 20a. Computing system 12b may boot, read the digital input from cable connection 16b, and know it is the second channel, setting its system controller as CPU 20b, and computing system 12c may boot, read the digital input from cable connection 16c, and know it is the third channel, setting its system controller as CPU 20c. This way, identical computing systems can be plugged in to each channel, while still having dissimilar CPU architectures as system controllers for each computing system.

Figure 3:
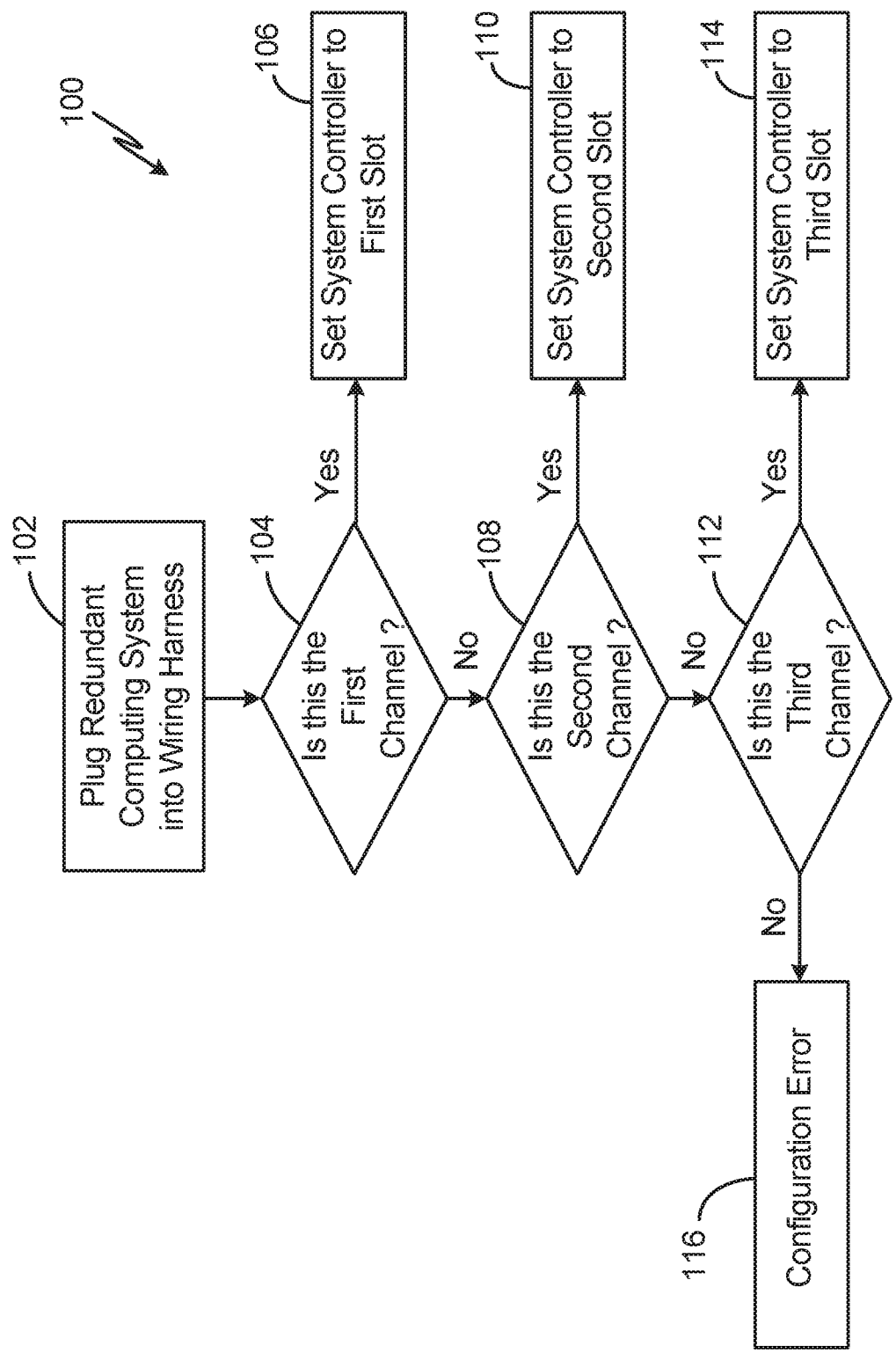
FIG. 3 is a flow chart illustrating a method of selecting a system controller for a redundant computing system.

FIG. 3 is a flowchart illustrating method 100 of selecting a system controller for a redundant computing system. At step 102, a redundant computing system is plugged into an external cable connection. The cable connection may connect the redundant computing system to a data bus, or other electronic system. At step 104, the redundant computing system receives a channel ID from the external cable connection. It is determined if the computing system is plugged into the first location, as indicated by the channel ID. If the redundant computing system is plugged into the first location, method 100 proceeds to step 106, and the processor in the first slot of the computing system is set to be the system controller, as is illustrated in FIG. 2A. If the redundant computing system is not plugged into the first location, method 100 proceeds to step 108.

At step 108, it is determined if the computing system is plugged into the second location, as indicated by the channel ID. If the redundant computing system is plugged into the second location, method 100 proceeds to step 110, and the processor in the second slot of the computing system is set to be the system controller, as is illustrated in FIG. 2B. If the redundant computing system is not plugged into the second location, method 100 proceeds to step 112.

At step 112, it is determined if the computing system is plugged into the third location, as indicated by the channel ID. If the redundant computing system is plugged into the third location, method 100 proceeds to step 114, and the processor in the third slot of the computing system is set to be the system controller, as is illustrated in FIG. 2C. If the redundant computing system is not plugged into the third location, method 100 proceeds to step 116 and reports a configuration error. While described for three redundant systems each having three parallel processors, this method can be adapted to handle any number of redundant systems with any number of parallel processors. For example, some systems may have two redundant systems each with two parallel processors. In this example, the channel ID can be determined in order to set one of the two CPUs as the system controller based on which of the two locations the computing system is installed.

Discussion of Possible Embodiments

The following are non-exclusive descriptions of possible embodiments of the present invention.

A system includes a first computing system and a first cable connector. The first computing system includes a first plurality of processors and a first interconnect circuit configured to connect the first plurality of processors to each other. The first cable connector is external to the first computing system and is configured to connect to the first interconnect circuit and provide a first channel identifier to the first computing system, and the first interconnect circuit is configured to set one of the first plurality of processors as a first system controller based on the first channel identifier.

The system of the preceding paragraph can optionally include, additionally and/or alternatively, any one or more of the following features, configurations and/or additional components:

A further embodiment of the foregoing system, further including a second computing system, and a second cable connector. The second computing system includes a second plurality of processors, and a second interconnect circuit configured to connect the second plurality of processors to each other. The second cable connector is configured to connect to the second computing system and provide a second channel identifier to the second computing system. The second interconnect circuit is configured to set one of the second plurality of processors as a second system controller based on the second channel identifier. The one of the first plurality of processors has a different architecture than the one of the second plurality of processors.

A further embodiment of any of the foregoing systems, further including a third computing system and a third cable connector. The third computing system includes a third plurality of processors, and a third interconnect circuit configured to connect the third plurality of processors to each other. The third cable connector is configured to connect to the third computing system and provide a third channel identifier to the third computing system. The third interconnect circuit is configured to set one of the third plurality of processors as a third system controller based on the third channel identifier. The one of the first plurality of processors and the one of the second plurality of processors both have different architectures than the one of the third plurality of processors.

A further embodiment of any of the foregoing systems, wherein the first computing system, the second computing system, and the third computing system are identical.

A further embodiment of any of the foregoing systems, wherein the first computing system, the second computing system, and the third computing system are part of an aircraft flight control system.

A further embodiment of any of the foregoing systems, wherein the first plurality of processors includes three parallel processors, the second plurality of processors includes three parallel processors, and the third plurality of processors includes three parallel processors.

A further embodiment of any of the foregoing systems, wherein the first computing system further includes at least one input/output card configured to communicate with the plurality of processors through the first interconnect circuit.

A redundant computing system includes a plurality of parallel processors, and an interconnect circuit configured to connect the redundant computing system to an external cable connection. The interconnect circuit receives a channel identifier from the external cable connection, and is configured to set one of the plurality of processors as a system controller based on the channel identifier.

The redundant computing system of the preceding paragraph can optionally include, additionally and/or alternatively, any one or more of the following features, configurations and/or additional components:

A further embodiment of the foregoing redundant computing system, wherein the plurality of parallel processors include a first processor, a second processor, and a third processor.

A further embodiment of any of the foregoing redundant computing systems, wherein the first processor has a first architecture, the second processor has a second architecture different than the first architecture, and the third processor has a third architecture different than the first and second architectures.

A further embodiment of any of the foregoing redundant computing systems, wherein the interconnect circuit receives the channel identifier as a digital input from the external cable connection, and selects the one of the plurality of processors as the system controller by controlling a control input of each of the plurality of processors.

A further embodiment of any of the foregoing redundant computing systems, wherein the interconnect circuit is configured to connect the redundant computing system to the external cable connection on an aircraft.

A further embodiment of any of the foregoing redundant computing systems, further including at least one input/output card, wherein the interconnect circuit is configured to connect the plurality of processors with the at least one input/output card.

A further embodiment of any of the foregoing redundant computing systems, wherein the at least one input/output card comprises three input/output cards.

A method includes connecting a first redundant computing system to a first cable connector, reading, by the first redundant computing system, a first channel identifier from the first cable connector; and setting, by an interconnect circuit of the first redundant computing system, one of a plurality of processors of the first redundant computing system as a system controller.

The method of the preceding paragraph can optionally include, additionally and/or alternatively, any one or more of the following features, configurations and/or additional components:

A further embodiment of the foregoing method, wherein setting, by the interconnect circuit of the first redundant computing system, the one of a plurality of processors of the first redundant computing system as the system controller includes setting a first one of the plurality of processors of the first redundant computing system as the system controller if the channel identifier is a first value, setting a second one of the plurality of processors of the first redundant computing system as the system controller if the channel identifier is a second value, and setting a third one of the plurality of processors of the first redundant computing system as the system controller if the channel identifier is a third value.

A further embodiment of any of the foregoing methods, further including connecting a second redundant computing system to a second cable connector; reading, by the second redundant computing system, a second channel identifier from the second cable connector, and setting, by an interconnect circuit of the second redundant computing system, one of a plurality of processors of the second redundant computing system as a system controller, wherein the one of the plurality of processors of the second redundant computing system has an architecture different than an architecture of the one of the plurality of processors of the first redundant computing system.

A further embodiment of any of the foregoing methods, further including connecting a third redundant computing system to a third cable connector; reading, by the third redundant computing system, a third channel identifier from the third cable connector, and setting, by an interconnect circuit of the third redundant computing system, one of a plurality of processors of the third redundant computing system as a system controller, wherein the one of the plurality of processors of the third redundant computing system has an architecture different than an architecture of the one of the plurality of processors of the first and the second redundant computing systems.

A further embodiment of any of the foregoing methods, wherein connecting the third redundant computing system includes connecting the third redundant computing system identical to the first and the second computing systems to the third cable connector.

A further embodiment of any of the foregoing methods, wherein connecting the first redundant computing system to the first cable connector includes connecting the first redundant computing system to the first cable connector on an aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   a first computing system comprising:
      a first plurality of processors, wherein each processor of the first plurality of processors is plugged into a slot in the first computing system and each of the first plurality of processors has a different CPU architecture than each remaining processor of the first plurality of processors; and
      a first interconnect circuit configured to connect the first plurality of processors to each other;
   a first cable connector, external to the first computing system, and configured to connect to the first interconnect circuit and provide a first channel identifier to the first computing system, wherein the first interconnect circuit is configured to set one processor of the first plurality of processors as a first system controller based on the first channel identifier rather than the slot into which the processor configured as the first system controller is plugged and the first system controller is responsible for handling initialization procedures for the first computing systems when the first computing system is booted up;
   a second computing system comprising:
      a second plurality of processors, wherein each processor of the second plurality of processors is plugged into a slot in the second computing system and each of the second plurality of processors has a different CPU architecture than each remaining processor of the second plurality of processors; and
      a second interconnect circuit configured to connect the second plurality of processors to each other;
   a second cable connector configured to connect to the second computing system and provide a second channel identifier to the second computing system, wherein the second interconnect circuit is configured to set one processor of the second plurality of processors as a second system controller based on the second channel identifier rather than the slot into which the processor configured as the second system controller is plugged and the second system controller is responsible for handling initialization procedures for the second computing systems when the second computing system is booted up, wherein the first system controller has a different CPU architecture than the second system controller;
   a third computing system comprising:
      a third plurality of processors, wherein each processor of the third plurality of processors is plugged into a slot in the third computing system and at least one of the third plurality of processors has a different CPU architecture than each remaining processor of the third plurality of processors; and
      a third interconnect circuit configured to connect the third plurality of processors to each other; and
   a third cable connector configured to connect to the third computing system and provide a third channel identifier to the third computing system, wherein the third interconnect circuit is configured to set one processor of the third plurality of processors as a third system controller based on the third channel identifier rather than the slot into which the processor configured as the third system controller is plugged and the third system controller is responsible for handling initialization procedures for the third computing systems when the third computing system is booted up, wherein the first system controller and the second system controller both have different CPU architectures than the third system controller;
   wherein the first computing system comprises three parallel processors, wherein each of the three parallel processors of the first computing system have different CPU architectures than any other processor of the three parallel processors of the first computing system; the second computing system comprises three parallel processors, wherein each of the three parallel processors of the second computing system have different CPU architectures than any other processor of the three parallel processors of the second computing system; and the third computing system comprises three parallel processors, wherein each of the three parallel processors of the third computing system have different CPU architectures than any other processor of the three parallel processors of the third computing system and wherein the first computing system, the second computing system, and the third computing system have identical hardware configurations.

2. The system of claim 1, wherein the first computing system, the second computing system, and the third computing system are part of an aircraft flight control system.

3. The system of claim 1, wherein the first computing system further comprises at least one input/output card configured to communicate with the plurality of processors through the first interconnect circuit.

4. A redundant computing system comprising:
   at least two computing systems comprising:
      a plurality of parallel processors, wherein each of the plurality of processors has a different CPU architecture than each remaining processor of the plurality of processors; and
      an interconnect circuit configured to connect the redundant computing system to an external cable connection, wherein the interconnect circuit receives a channel identifier from the external cable connection, and wherein the interconnect circuit is configured to set one of the plurality of processors as a system controller based on the channel identifier and the system controller is responsible for handling initialization procedures for the plurality of parallel processors when the plurality of parallel processors is booted up;
   wherein the plurality of parallel processors comprise a first processor, a second processor, and a third processor and the first processor has a first CPU architecture, the second processor has a second CPU architecture different than the first CPU architecture, and the third processor has a third CPU architecture different than the first and second CPU architectures;

each of the at least two computing systems have identical hardware configurations and that each of the at least two computing systems has a different processor set as the system controller responsible for handling initialization procedures when each of the at least two computing system is booted up.

5. The redundant computing system of claim 4, wherein the interconnect circuit receives the channel identifier as a digital input from the external cable connection, and selects the one of the plurality of processors as the system controller by controlling a control input of each of the plurality of processors.

6. The redundant computing system of claim 4, wherein the interconnect circuit is configured to connect the redundant computing system to the external cable connection on an aircraft.

7. The redundant computing system of claim 4, further comprising at least one input/output card, wherein the interconnect circuit is configured to connect the plurality of processors with the at least one input/output card.

8. The redundant computing system of claim 7, wherein the at least one input/output card comprises three input/output cards.

9. A method comprising:
connecting a first redundant computing system to a first cable connector;
reading, by the first redundant computing system, a first channel identifier from the first cable connector;
setting, by an interconnect circuit of the first redundant computing system, one of a plurality of processors of the first redundant computing system as a first system controller, wherein at least one of the plurality of processors of the first redundant computing system has a different CPU architecture than each remaining processor of the plurality of processors of the first redundant computing system and the first system controller is responsible for handling initialization procedures for the first redundant computer system when the first redundant computer system is booted up;
connecting a second redundant computing system to a second cable connector;
reading, by the second redundant computing system, a second channel identifier from the second cable connector; and
setting, by an interconnect circuit of the second redundant computing system, one of a plurality of processors of the second redundant computing system as a second system controller, wherein at least one of the plurality of processors of the second redundant computing system has a different CPU architecture than each remaining processor of the plurality of processors of the second redundant computing system and the second system controller is responsible for handling initialization procedures for the second redundant computer system when the second redundant computer system is booted up and the second system controller has a CPU architecture different than a CPU architecture of the first system controller;
connecting a third redundant computing system to a third cable connector;
reading, by the third redundant computing system, a third channel identifier from the third cable connector; and
setting, by an interconnect circuit of the third redundant computing system, one of a plurality of processors of the third redundant computing system as a third system controller, wherein at least one of the plurality of processors of the third redundant computing system has a different CPU architecture than each remaining processor of the plurality of processors of the third redundant computing system and the third system controller is responsible for handling initialization procedures for the third redundant computer system when the third redundant computer system is booted up and the third system controller has a CPU architecture different than the CPU architecture of the first system controller and the CPU architecture of the second system controller,
wherein the first redundant computing system comprises three parallel processors, wherein each of the three parallel processors of the first redundant computing system have different CPU architectures than any other processor of the three parallel processors of the first redundant computing system; the second redundant computing system comprises three parallel processors, wherein each of the three parallel processors of the second redundant computing system have different CPU architectures than any other processor of the three parallel processors of the second redundant computing system; and the third redundant computing system comprises three parallel processors, wherein each of the three parallel processors of the third redundant computing system have different CPU architectures than any other processor of the three parallel processors of the third redundant computing system and wherein the first redundant computing system, the second redundant computing system, and the third redundant computing system have identical hardware configurations.

10. The method of claim 9, wherein setting, by the interconnect circuit of the first redundant computing system, the one of a plurality of processors of the first redundant computing system as the system controller comprises setting a first one of the plurality of processors of the first redundant computing system as the system controller if the channel identifier is a first value, setting a second one of the plurality of processors of the first redundant computing system as the system controller if the channel identifier is a second value, and setting a third one of the plurality of processors of the first redundant computing system as the system controller if the channel identifier is a third value.

11. The method of claim 9, wherein connecting the first redundant computing system to the first cable connector comprises connecting the first redundant computing system to the first cable connector on an aircraft.

* * * * *